United States Patent
Cleek

[19]

[11] Patent Number: 5,782,445
[45] Date of Patent: Jul. 21, 1998

[54] MOUNTING AND LOCATING DEVICE FOR A BREAKAWAY TOOL HOLDER

[75] Inventor: Alvin L. Cleek, Wauwatosa, Wis.

[73] Assignee: MG Systems & Welding, Inc., Menomonee Falls, Wis.

[21] Appl. No.: 763,804

[22] Filed: Dec. 11, 1996

[51] Int. Cl.[6] .................................................. B23K 7/10
[52] U.S. Cl. .................................. 248/206.5; 266/77
[58] Field of Search .......................... 248/206.5, 78.1, 248/279.1, 283.1, 288.31; 266/67, 48, 76, 68

[56] References Cited

U.S. PATENT DOCUMENTS 4,899,993 2/1990 Habermann et al. .
5,018,705 5/1991 Baldwin et al. .

FOREIGN PATENT DOCUMENTS 1119088 12/1960 Germany ................................ 266/77
4351269 7/1992 Japan .................................... 266/77

OTHER PUBLICATIONS

Mechanical Design Analysis by M.F. Spotts, Prentice-Hall, Inc., p. 410.

*Primary Examiner*—Alvin C. Chin-Shue
*Assistant Examiner*—Long Dinh Phan
*Attorney, Agent, or Firm*—Andrus, Sceales, Starke & Sawall

[57] ABSTRACT

A breakaway mechanism for supporting a non-contact tool to protect the tool in the event of an inadvertent collision includes a non-redundant locating system to establish precise tool repositioning and a magnetic holding device to retain the tool in its operative attached position. The non-redundant locating system assures initial mounting and relocating after breakaway which is immune from inaccuracies resulting from manufacturing tolerances and the magnetic mounting device permits breakaway separation free from any mechanical restraint. The invention is particularly suitable for use on an automatic metal cutting torch, but may be applied to many non-contact tools which are positioned and operated by computer or robotic control.

15 Claims, 5 Drawing Sheets

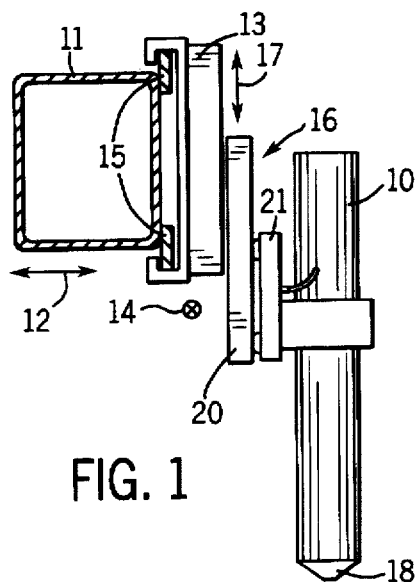
FIG. 1
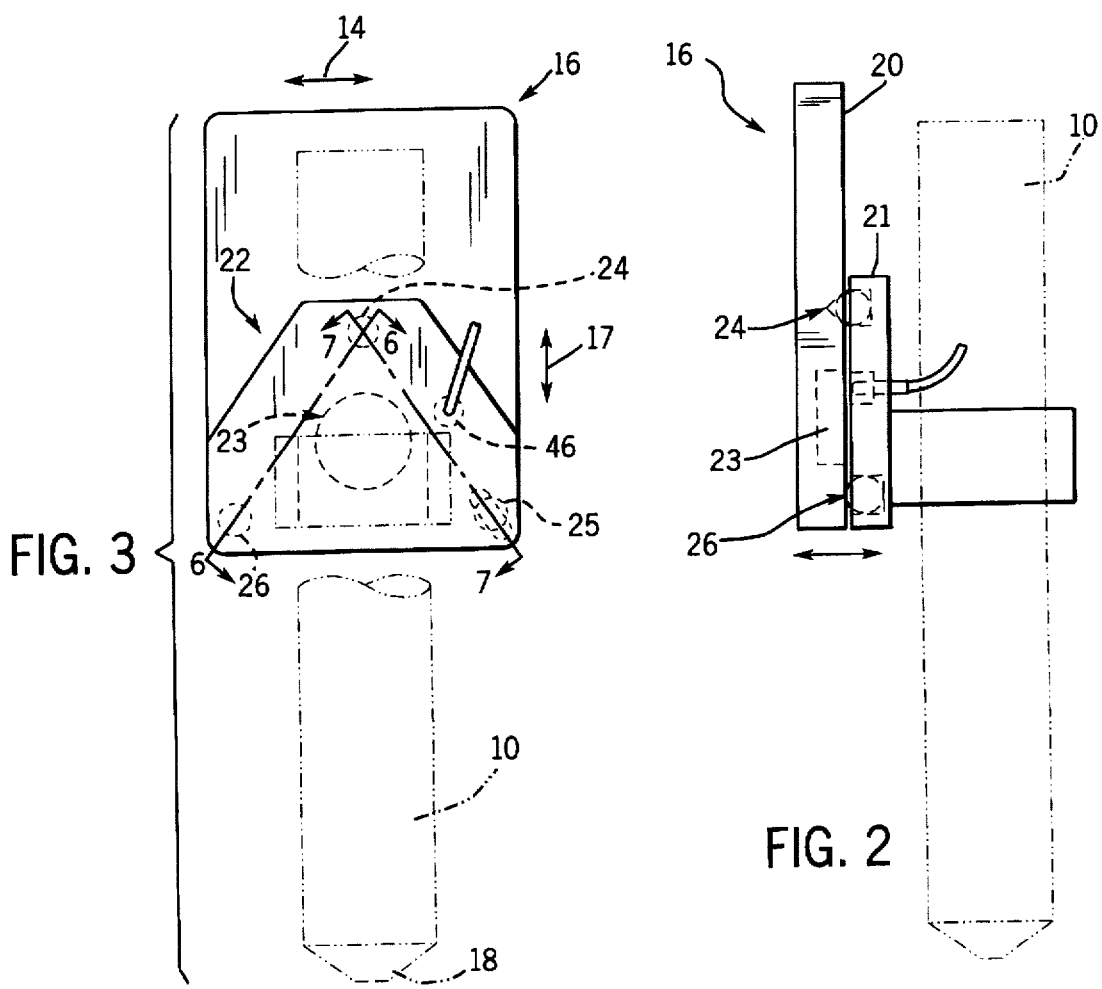

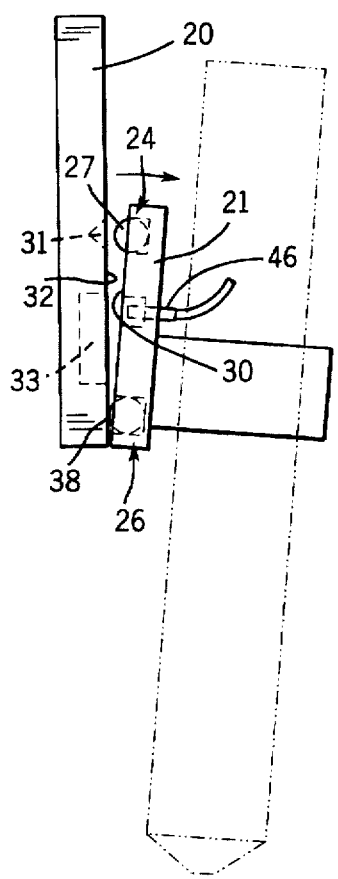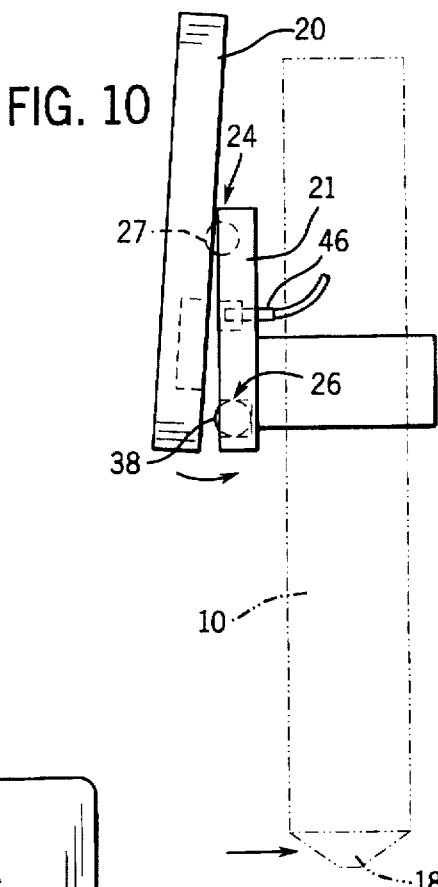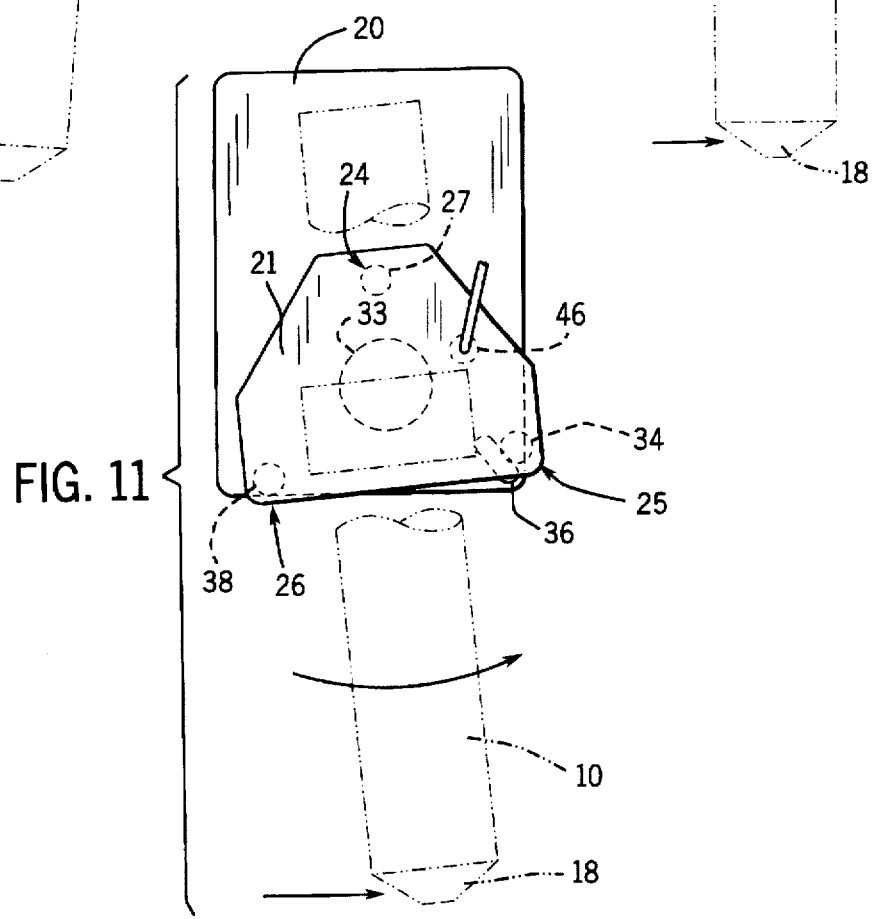

MOUNTING AND LOCATING DEVICE FOR A BREAKAWAY TOOL HOLDER

BACKGROUND OF THE INVENTION

The present invention relates to a breakaway tool mounting device and, more particularly, to such a device which includes a non-redundant locating system to provide consistent positioning and repositioning of the tool holder.

Breakaway tool holders for non-contact or light contact tools are well known in the art. In addition to a metal cutting torch for which the embodiment of the invention described herein is particularly well suited, the tool mounting and locating system of the present invention may be used as well for welding torches, spray guns, blast nozzles, glue guns, or any other tool that does not apply a high force to the work during its operation.

U.S. Pat. Nos. 4,899,993 and 5,018,705 describe breakaway tool holders which are particularly well suited to mount plasma cutting torches on computer controlled cutting machines. In such cutting machines, one or more cutting torches are mounted on a carriage mechanism which typically provides automatic torch positioning movement on three mutually perpendicular coordinate axes and, in addition, rotational movement for angularly positioning the torch or torches. In a typical application, the torch supporting carriage moves over a cutting table on which the metal plate or other workpiece is supported and cuts the workpiece in accordance with a programmed pattern. Occasionally, an obstruction occurs in the path of torch movement and the breakaway torches are designed to separate from the tool holder when an obstruction is encountered to avoid damage to the tool, the holder or the carriage. In addition, breakaway movement of the torch from the holder typically triggers a switch to shut down the carriage drive and stop movement of the torch.

Prior art breakaway torch holders, such as the devices described in the above identified patents, remain subject to a number of operating problems. All of the prior art tool holders rely on some type of direct mechanical connection even after breakaway separation of the torch has occurred. With rapidly moving cutting torches, the response of the sensing switch to torch breakaway is sometimes too slow to prevent damage even when the torch has been separated from its mounting. In addition, mechanically linked breakaway devices are not equally responsive to forces imposed on the torch or cutting tool from all directions and, in many devices, may even be completely non-responsive to forces from certain directions. Also, accurate repositioning of cutting torches after breakaway has been difficult to attain with repeatable accuracy.

The subject invention provides a breakaway tool mounting device which includes a non-redundant locating system and a releasable torch holder which virtually eliminates mechanical connection between the tool holder and the carriage.

SUMMARY OF THE INVENTION

A breakaway tool mounting device is utilized to support a tool or tool holder on a carriage which provides three axis movement to the tool. The mounting device includes a fixed support plate which is attached to the carriage and has a generally planar support surface, a tool mounting plate which is demountably attached to the support plate and has a generally planar mounting surface which is disposed parallel to the support surface when in an operative attached position, and means are provided for releasably holding the plates in the attached position. A non-redundant locating system provides a fixed relation between the plates in the attached position, the locating system including first, second and third locators which provide, with the holding means, operative contact between the plates. The first locator provides restraint to movement between the plates in both directions on all three axes of movement, the second locator provides restraint to movement between the plates in both directions on two of the three axes of movement. The third locator provides restraint to movement between the plates in both directions on one of the three axes. In the preferred embodiment, the planar surfaces of the support plate and mounting plate are spaced apart in the operative attached position.

Each of the locators comprises a locating protrusion which is attached to and extends from the planar surface of one of said plates. The locating protrusions preferably have circular cross sections in a plane parallel to the surfaces of the plates. In the preferred embodiment, the locating protrusions are spherical.

The first spherical locating protrusion cooperates with a conical depression in the other of the two plates, the conical depression being adapted to receive the spherical protrusion and provide operative full circular line contact. The second spherical locating protrusion cooperates with a V-shaped depression defined by intersecting planar side walls in the other of the two plates, the V-shaped depression being adapted to receive the spherical protrusion and provide operative two point contact. The third spherical locating protrusion is adapted to contact a flat surface in the other of the two plates which flat surface is parallel to the planar plate surface and is adapted to provide, with the protrusion, operative one point contact.

In the preferred embodiment, each of the spherical locating protrusions comprises a ball which is pressed into a blind hole in the support or mounting plate to which it is attached. The depth of the blind hole for each location ball is selected such that the ball bottoms in the hole.

The releasable holding means for the plates preferably comprises a magnet which is attached to one of the two plates and cooperates with a magnetic surface in the other of the plates opposite the magnet to maintain the plates in the operative attached position. Means are also provided to sense the displacement of the mounting plate from its parallel attached position. Control means are also provided which are responsive to a displacement signal from the sensing means to control movement of the carriage. Preferably, the support plate is attached in a manner which positions the planar support surface in a plane defined by horizontal and vertical carriage movement.

In accordance with another variation of the subject invention, the breakaway tool mounting device supports a tool holder on a tool carriage having three-axis operation which provides six directions of movement and in which the mounting device includes a fixed generally planar support surface on the carriage, a tool mounting plate which is demountably attached to the support surface and has a generally planar mounting surface positioned parallel to the support surface and defines therewith an operative attached position. A magnetic device releasably holds the mounting plate in the attached position. A non-redundant location system provides a fixed relation between the mounting and support surfaces in the attached position, the locating system including: a first locator which provides operative contact and restraint to movement between the surfaces in five of the six directions of movement; a second locator which provides operative contact and restraint to movement between the surfaces in three of the five directions; a third locator which provides operative contact and restraint to movement between the surfaces in one of the five directions; and, the magnetic device providing restraint to movement in the sixth direction not restrained by the first, second and third locators.

BRIEF DESCRIPTION OF THE DRAWINGS

FIG. 1 is a generally schematic side elevation showing a conventional cutting torch carriage mechanism and breakaway torch Mounting device of the subject invention.

FIG. 2 is an enlarged view of the breakaway torch mounting device shown in FIG. 1 and additionally showing features of the non-redundant locating system.

FIG. 3 is a front elevation of the mounting device shown in FIG. 2.

FIGS. 9, 10 and 11 are side elevation views similar to FIG. 2 showing the breakaway function of the present invention under forces imposed on the cutting torch from different directions.

DETAILED DESCRIPTION OF THE PREFERRED EMBODIMENT

Figure 4:
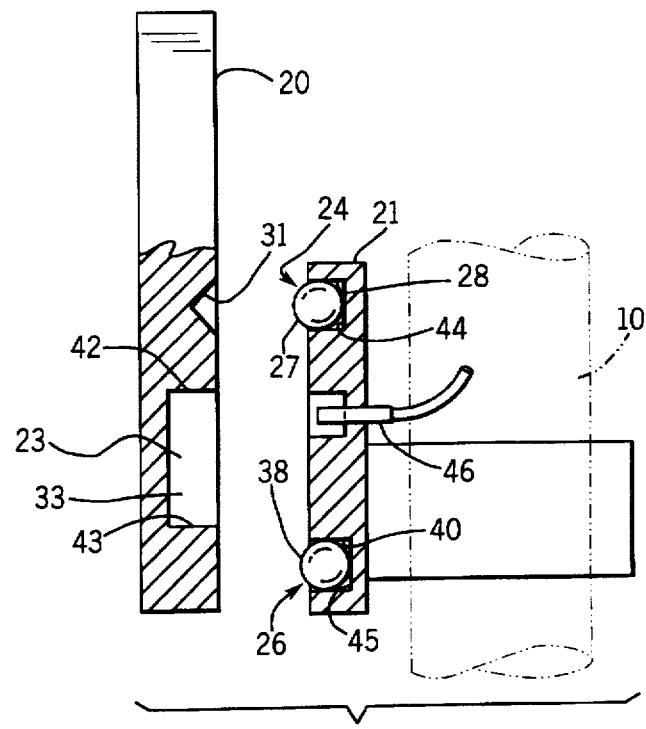
FIG. 4 is a view similar to FIG. 2 with certain portions broken away to show details of the construction.

FIG. 1 shows, in generally schematic form, the main elements of a cutting torch mounting and carriage system. The cutting torch 10 is a non-contact tool, and the present invention may be utilized to carry a number of other types of non-contact tools, as indicated above. A main cross beam 11 typically spans a cutting table (not shown) which supports a metal plate or other workpiece and over which the cutting torch 10 is moved to effect a programmed cutting process. The main cross beam 11 is typically supported by wheeled carriages on opposite ends which are driven on spaced parallel tracks in both directions on a first horizontal axis 12 to provide the first two directions of torch movement. A tool carriage 13 is mounted to traverse the cross beam 11 on a second horizontal axis 14 (perpendicular to the plane of FIG. 1) to provide another two directions of torch movement. The tool carriage 13 may operate along the second horizontal axis 14 on wheeled or sliding tracks 15 in a manner well known in the art. A torch holder 16 is mounted for reciprocal movement with respect to the carriage 13 along a vertical axis 17 to provide two additional directions of torch movement. The vertical movement of the torch holder 16 may be provided by any type of well known translating mechanism, such as a rack and pinion, lead screw, or the like. Suitable drive devices provide powered movement of the tool carriage 13 along the beam 11 and the torch holder 16 with respect to the carriage.

Reciprocal movement of the cutting torch 10 along each of the three mutually perpendicular axes 12, 14 and 17 allows universal positioning of the torch with respect to the workpiece supported below it. The six directions of torch movement provided by the three coordinate axes allow the position of the cutting tip 18 of the torch 10 to be precisely monitored and controlled and to provide the required cutting accuracy.

The torch holder 16 includes a support plate 20 which provides the vertical sliding attachment to the tool carriage 13, and a mounting plate 21 which actually carries the cutting torch 10 and which is demountably attached to the support plate 20 allowing it to break away in the event the torch tip 18 encountered an obstacle in its path of cutting movement. If the mounting plate 21 and attached torch 10 cannot be accurately and repeatably reattached to the support plate 20, cutting accuracy will be lost. Loss of accuracy in remounting may occur as a result of inherent deficiencies in the device used to locate (or relocate) the mounting plate with respect to the support plate, or may occur as a result of deformation of some part of the tool mounting assembly in a collision. The non-redundant locating system and releasable holding device of the present invention address and correct both of the foregoing problems.

The non-redundant locating system 22 and releasable holding device 23 of the present invention provide a breakaway connection between the support plate 20 and the mounting plate 21 which, together, act to permit accurate repositioning of the cutting torch 10 and breakaway movement which is mechanically unrestricted. In its fully aligned and attached position, as shown in FIGS. 2 and 3, the locating system 22 utilizes three different locators, each of which provides restraint against movement which is different from that of the others and is provided in a non-redundant manner. In particular, a first locator 24 is constructed such that, in the attached position, it restricts movement of the mounting plate 21 and attached cutting torch in any of the six directions of movement defined by the three coordinate axes 12, 14 and 17. A second locator 25 operates with the holding device 23 to restrict movement between the plates 20 and 21 in four directions along two of the coordinate axes. A third location 26 restricts movement in two directions along one of the axes.

The first locator 24 comprises a first steel sphere 27 mounted with an interference fit in a blind hole 28 formed in a planar face 30 in the mounting plate 21. The sphere 27 is received in a conical depression 31 formed in an opposing planar face 32 on the support plate 20. In the attached position, the sphere 27 makes full circular line contact with the surface of the conical depression 31. This provides full restraint against movement in the plane defined by axes 14 and 17. The holding device 23 which maintains the plates 20 and 21 in the attached position is in the form of a magnet 33 which will be described in greater detail below. In the attached position, the plates are thus restrained against movement in either direction on the first horizontal axis 12. In this manner, the first locator 24 provides complete restraint to linear motion in all six directions of movement defined by the three coordinate axes.

Figure 5:
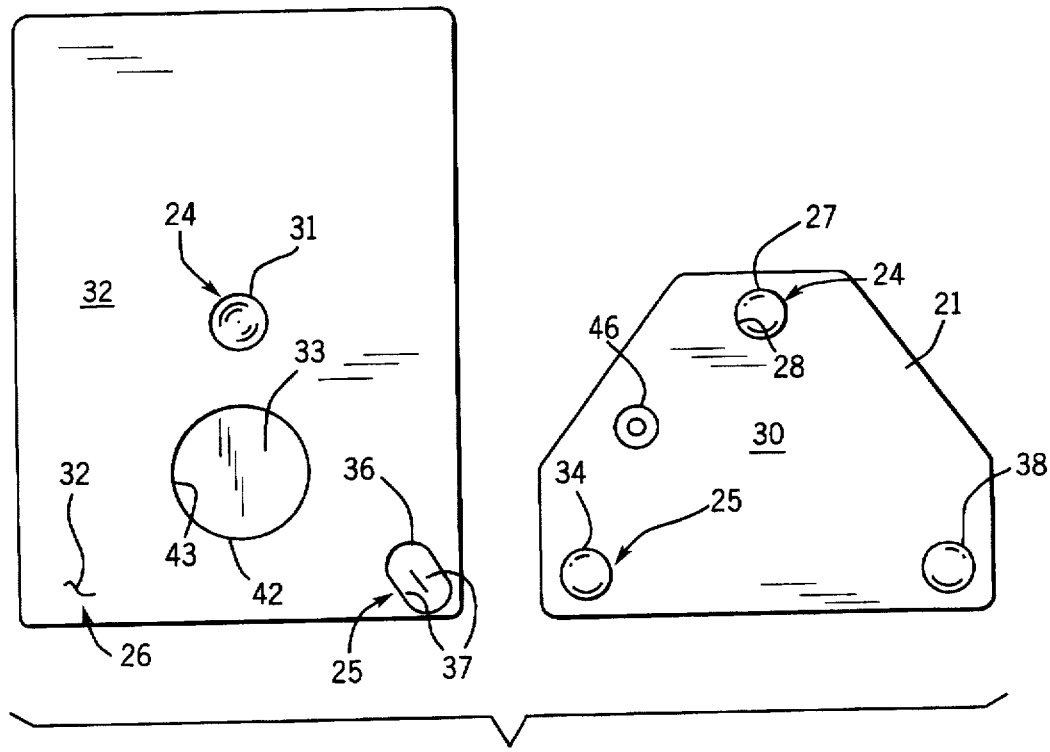
FIG. 5 is an exploded view of the support plate and mounting plate used in the mounting and locating system of the present invention.
Figure 6:
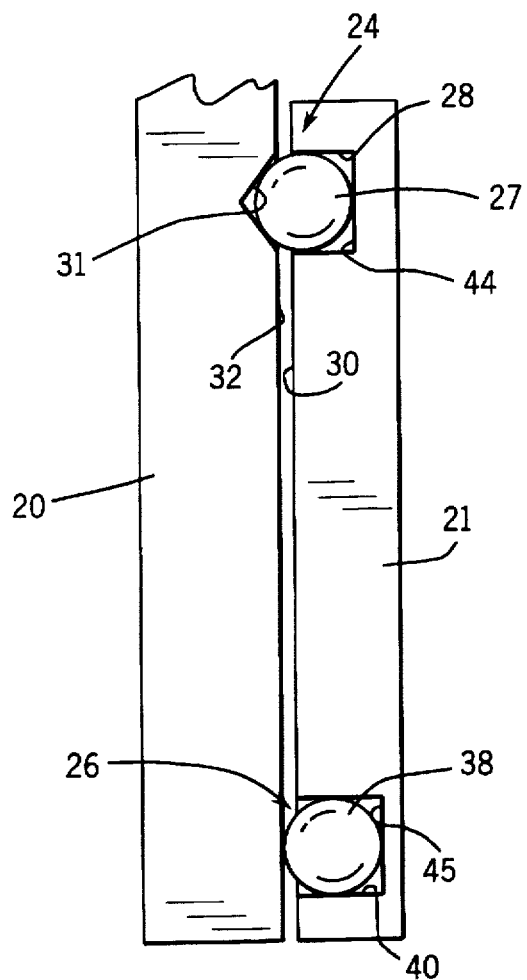
FIG. 6 is an enlarged sectional view taken on line 6—6 of FIG. 3.
Figure 7:
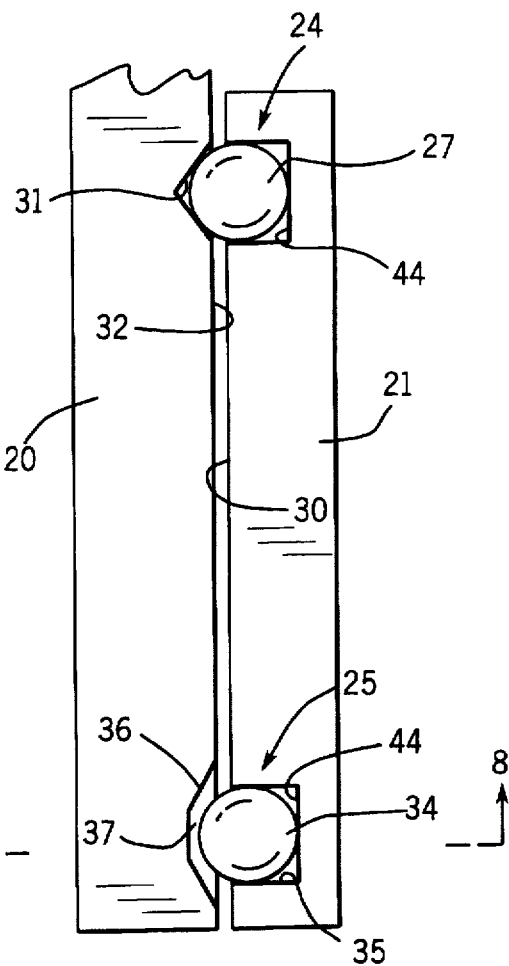
FIG. 7 is an enlarged sectional view taken on line 7—7 of FIG. 3.
Figure 8:
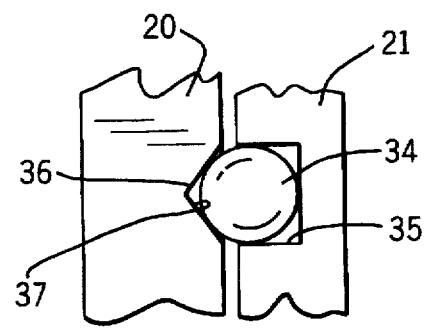
FIG. 8 is a sectional view taken on line 8—8 of FIG. 7.

The second locator 25 comprises a second steel sphere 34 mounted with an interference fit in a blind hole 35 in the face 30 of mounting plate 21. In the attached position, the second sphere 34 is received in an elongated conical slot 36 formed in the face 32 of plate 20. Referring also to FIGS. 5–7, the walls 37 of the slot 36 form a V-shaped groove defined by a cone angle which may, but need not be the same as that of the conical depression 31. The slot 36 is oriented such that the longitudinal axis of the slot preferably intersects the center of the conical depression 31 of the first locator 24.

The second sphere 34 makes two point contact with the walls 37 of the slot and, in this manner, provides restraint to relative rotational movement between the plates 20 and 21 around the axis of the first locator 24 and in the plane of the axes 14 and 17. However, there is no restraint to movement along the longitudinal axis of the slot 36. In a manner similar to the first locator, movement in one direction along perpendicular axis 12 is inherently restrained by contact between the sphere 34 and the slot walls 37, and opposite linear movement on that axis is restrained by the holding magnet 33.

The third locator 26 comprises a third steel sphere pressed into a third blind hole 40 formed in the face 30 of mounting plate 21. The third sphere 38 contacts and rests against the planar face 32 of the support plate 20. In this manner, the third locator 26 provides no restraint to movement in the plane of the face of the plate 21. However, movement is inherently restricted in both directions perpendicular to the plane by point contact of the sphere 38 with the surface 20 and, in the opposite linear direction, by the force of the holding device 23.

Figure 12A:
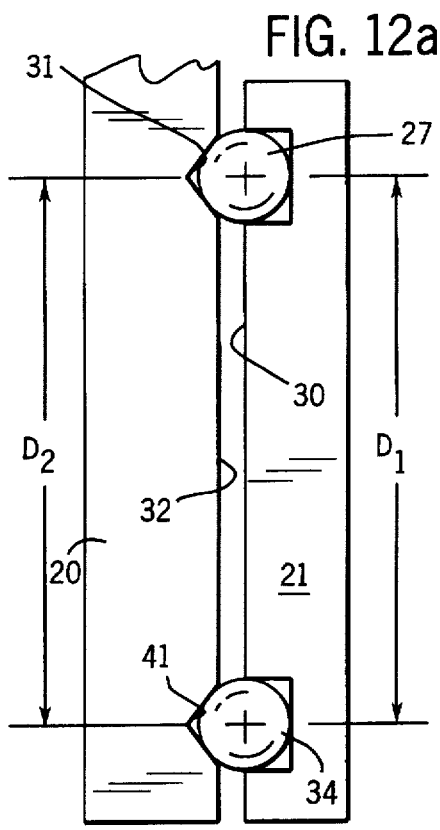
FIG. 12 is a composite schematic representation of the inaccuracies in a redundant locating device.
Figure 12B:
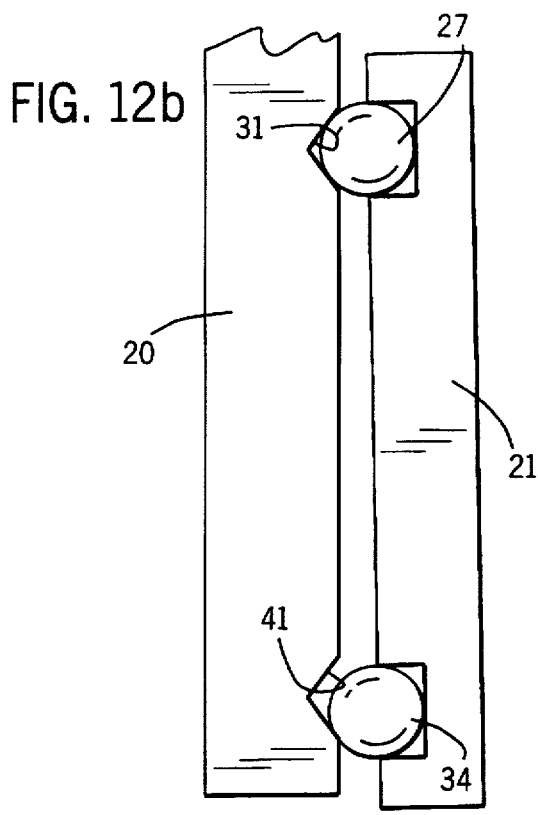
Figure 12C:
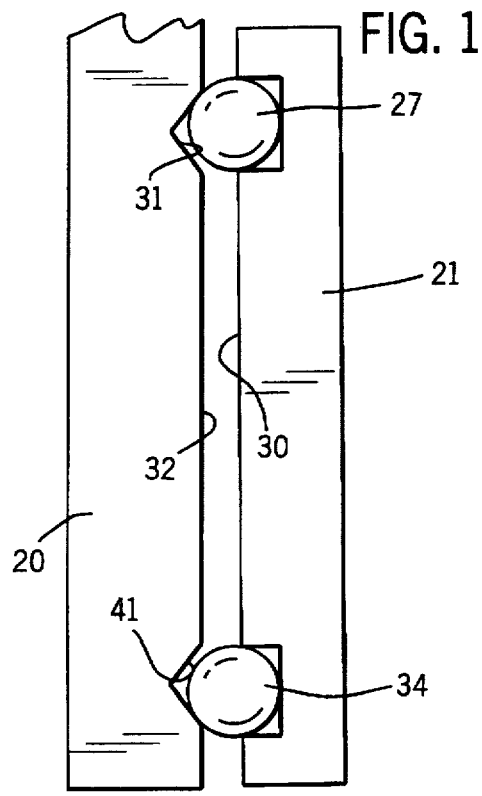
Figure 12D:
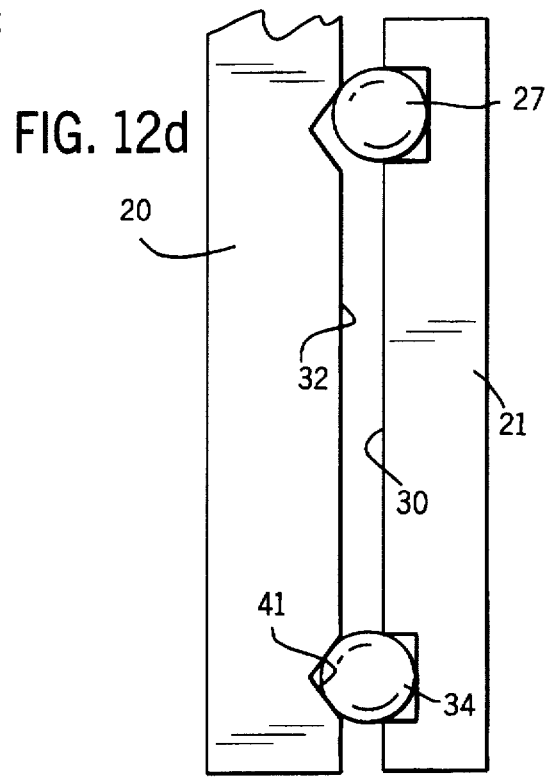

The significance of the elimination of redundancy in the locating system of the present invention will be explained briefly by way of the example shown in FIG. 12. If, for example, the elongated slot 36 for the second locator 35 were replaced with a conical depression 41 identical to conical depression 31 of the first locator 24, the desired relationship between the support plate 20 and mounting plate 21, with their respective faces 32 and 30 parallel, can be achieved only if the distance $d_1$ between the spheres 27 and 34 is exactly the same as the distance $d_2$ between the conical depressions 31 and 41. However, such equality in the distances $d_1$ and $d_2$ cannot practically be attained within the limits of ordinary manufacturing tolerance and, furthermore, may be further adversely affected by differential thermal expansion between the parts of the assembly in use. FIG. 12a shows the idealized condition where $d_1$ equals $d_2$, but with a redundancy in the locating system. In FIGS. 12b and 12d, if the distance $d_1$ is greater than $d_2$ there will be a tendency of one or the other of the spheres 27 and 34 to seat in its respective conical depression 31 or 41 while the other one cannot properly seat. As shown, the result is a loss of parallelism between the faces 30 and 32 of the plates which, in either the FIG. 12b or FIG. 12d position, results in misalignment. Furthermore, as shown in FIG. 12c, an infinite number of unpredictable stable positions lie between the 12b and 12d extremes.

Referring also to FIG. 4, the mounting magnet 33 has a cylindrical body 42 which is mounted in a suitable cylindrical depression 43 in the face 32 of the support plate 20, preferably so that the face of the magnet lies in the plane of the face 20. The magnet 33 may be held in place in any convenient manner, including an interference fit, a mounting screw, adhesives, or the like. The magnet 33 acts upon the ferrous metal body of the mounting plate 21 to securely hold the cutting torch 10 in its attached operative position. As shown, the locators 24, 25 and 26 are arranged in approximately the pattern of an equilateral triangle and the magnet 33 is positioned centrally therein. However, the position of the magnet may be varied considerably, including placement with its center of force anywhere within the triangle, depending on desired breakaway and remounting characteristics. Furthermore, the strength of the magnet 33 may be varied as desired and more than one magnet may be utilized. In the attached operative position, the plates 20 and 21 are spaced apart slightly to allow the locators to seat properly as the mounting plate 21 and attached cutting torch 10 are moved into position on the support plate 20. Also, the spaced orientation between the support and mounting plates 20 and 21 accommodates breakaway movement, as will be described.

As may best be seen in FIGS. 6 and 7, the first and second blind holes 28 and 35, which receive the respective first and second spheres 27 and 34, are formed to the same depth and preferably utilize the flat bottoms 44 to control the depth to which the spheres are inserted and, thus, the distances by which they protrude from the planar face 30 of the mounting plate 21. The amount of protrusion of the first and second spheres 27 and 34 is the same because the size and cone angle of the conical depression 31 and slot 36 are the same. The third steel sphere 38, in the embodiment shown, is received in the blind hole 40 which is somewhat deeper than holes 28 and 35. This is because the third sphere 38 is not received in any depression in the planar surface 32 of the support plate 20, but rather makes direct contact therewith. Therefore, the third sphere 38 must be recessed in the mounting plate 21 further than either of the other two spheres, but in a manner similar to the others, the sphere 38 utilizes a flat bottom 45 in blind hole 40 to establish the amount of protrusion. Obviously, the third sphere 38 could be mounted to the same depth as the first and second spheres 27 and 34 if a suitable flat depression were formed in the face of the support plate 20 to provide point contact and unrestricted movement in the plane of the flat depressed surface.

Referring now to FIGS. 9–11, there are shown three modes of initial breakaway movement of the cutting torch 10 resulting from a horizontal force imposed on the tip 18 of the torch. Although the breakaway mounting system of the present invention will respond effectively to potentially damaging forces imposed from any direction, the horizontal forces depicted in these drawing figures are the most typical and may result, for example, from automatic programmed torch movement while cutting into a piece of scrap cut from a workpiece. In FIGS. 9 and 10, the force is imposed perpendicularly to the planar faces of the support and mounting plates 20 and 21, but in opposite directions along the first horizontal axis 12. In FIG. 11, the force is imposed in one direction along the second horizontal axis 14 and parallel to the planar faces of the plates. In FIG. 9, the horizontal force imposed on the cutting tip 18 will cause the second and third spheres 34 and 38 to rotate or rock on their respective contacts and the first steel sphere 27 to be displaced from its conical seat 31. In FIG. 10, a horizontal impact force from the opposite direction will cause the first steel sphere 27 to rotate in its conical depression 31 and the second and/or third spheres 34 and 38 to be displaced out of contact with, respectively, the slot 36 and the planar face 32 of the support plate 20. A horizontal force on the torch tip imposed from the side, as shown in FIG. 11, will result in an initial rotation of the first sphere 27 in the conical depression 31, sliding movement of the third sphere 38 over the face 32, and a displacement of the second sphere 34 out of the slot 36. This latter movement will also cause a relative displacement of the planar face 30 of the mounting plate 21 out of its parallel orientation with the planar face 32 of the support plate in a manner similar to the displacement shown schematically in FIGS. 9 and 10. It should be noted that forces on the torch from other directions, such as a vertical impact on the torch tip, will result in a similar breakaway response.

Relative displacement between the plates 20 and 21 from their parallel attached positions is detected by a proximity switch 46 which, in the embodiment shown, is mounted in the face of the mounting plate 21. Any change in the distance between the faces 30 and 32 of the plates caused by displacement of one or both of the locators 24 and 25 results in the generation of a displacement signal from the proximity switch 46. The signal may be utilized to alert the operator, sound an alarm, but preferably also to shut down the cutting torch drive. Once the mounting plate 21 and attached cutting torch 10 are moved sufficiently to generate a displacement signal from the proximity switch 46, continued movement as a result of the load or force imposed on the torch will eventually move the mounting plate 21 out of the influence of the magnet 33. Without any continuing mechanical restraint on the cutting torch, further movement beyond its initially displaced position will not result in damage to the torch or the mounting assembly. In the prior art described above, on the other hand, some mechanical breakaway systems allow only limited movement after initial disengagement, and continued torch movement may result in rigid and potentially damaging contact. In other prior art breakaway systems, resilient spring devices absorb some of the displacing force, but this force increases with distance and is also subject to relatively small limits before becoming rigid. In both cases, a collision occurring at high torch speed may allow several inches of torch movement after impact and before shut down which is beyond the limits of either type of prior art system. In the system of the present invention, on the other hand, the breakaway of the mounting plate 21 is complete and not subject to any mechanical coupling after initial displacement. Furthermore, the magnetic force of the mounting system decreases as the mounting plate 21 is displaced further from the support plate carrying the magnet. It may be desirable to have some sort of loose safety line interconnecting the support plate and mounting plate to, for example, prevent the cutting torch from falling onto the work table after breakaway separation. On the other hand, it may be possible to utilize the conventional fuel supply and power lines to the torch (not shown) to support the torch after separation.

It is preferable to use a conventional inductive proximity switch 46, but an optical type of detector or a mechanical limit switch may also be utilized. The proximity switch 46 is shown in a presently preferred location in a position generally between the first and second locators. Because displacement of one or the other of these locators defines the typical mode of initial breakaway separation, placement of the proximity detector as shown provides the fastest response to displacement.

The triangular orientation of the locators 24, 25 and 26 provides a stable and desired three point support. However, the locator positioning does not have to define an equilateral triangle, and many other suitable arrangements and positioning of the three locators are possible.

Although the steel spheres 27, 34 and 38 are preferred for use in the locators, other shapes may also be utilized. For example, conical or frustoconical protrusions could be utilized for all three locators. Combinations of different shapes might also be used. It is also possible to position one or all of the spheres in the support plate 20, with the corresponding seat or contact surface then placed in the mounting plate 21. However, as indicated, the spheres 27, 34 and 38 readily provide the inherent full line, two point, and single point contacts, respectively, which provide the most simple contact for the desired non-redundant locating system.

The releasable holding device 23 is not restricted to use of a magnet 33, although the magnet is the presently preferred means for releasably holding the plates 20 and 21 in their attached position. However, in an application where only a slight amount of relative displacement between the plates can or need be tolerated, a resilient holding device might be substituted for the magnet 33. For example, the plates 20 and 21 could be held in their attached position with a bolt extending through a large clearance hole in one plate and threaded into a tapped hole in the other plate and with a compression spring trapped between the bolt head and the face of the plate with the large clearance hole. This would permit limited relative displacement between the plates as a result of a load imposed from any direction sufficient to generate a displacement signal from the proximity switch. However, complete separation between the plates could not be accommodated and thus only limited movement after detected separation could be tolerated. Alternately, the releasable holding device could comprise resilient spring-biased detents of the type described in the above identified U.S. Pat. No. 4,899,993. The releasable devices disclosed therein might, for example, be mounted on the support plate 20 in a triangular arrangement with the spring-biased spherical ends in engagement with the side edges of the mounting plate 21.

I claim:

1. A breakaway tool mounting device for supporting a tool holder on a tool carriage providing three axis movement, said mounting device comprising:
   a support plate attached to the carriage and having a generally planar support surface;
   a tool mounting plate demountably attached to said support plate and having a generally planar mounting surface disposed parallel to said support surface in an attached position;
   means for releasably holding said plates in said attached position; and,
   a non-redundant locating system for providing a fixed relation between said plates in the attached position, said system including first, second and third locators providing, with said holding means, operative contact between said plates, said first locator providing restraint to movement between said plates in both directions on all three axes of movement, said second locator providing restraint to movement between said plates in both directions on two of said axes of movement, and said third locator providing restraint to movement between said plates in both directions on one of said axes.

2. The mounting device as set forth in claim 1 wherein the planar surfaces of said support plate and said mounting plate are spaced apart in the attached position.

3. The mounting device as set forth in claim 1 wherein said locators each comprises a locating protrusion attached to and extending from the planar surface of one of said plates.

4. The mounting device as set forth in claim 3 wherein each of said locating protrusions has a circular cross section in a plane parallel to the surface to which the protrusion is attached.

5. The mounting device as set forth in claim 4 wherein said locating protrusions are spherical.

6. The mounting device as set forth in claim 4 wherein said first locator comprises a spherical first locating protrusion, and a conical depression in the other of said plates, said conical depression adapted to receive said spherical first protrusion and provide full circular operative line contact.

7. The mounting device as set forth in claim 6 wherein said second locator comprises a spherical second locating protrusion, and a V-shaped depression defined by intersecting planar side walls in the other of said plates, said V-shaped depression adapted to receive said spherical second protrusion and provide operative two point contact.

8. The mounting device as set forth in claim 7 wherein said third locator comprises a spherical third locating protrusion, and a flat surface in the other of said plates, parallel to the planar surface thereof and adapted to provide operative one point contact.

9. The mounting device as set forth in claim 8 wherein each of said locators comprises a ball held with a press fit in a blind hole in one of said support and mounting plates.

10. The mounting device as set forth in claim 9 wherein the depth of the blind hole for each locator ball is selected such that the ball bottoms therein.

11. The mounting device as set forth in claim 1 wherein said holding means comprises a magnet attached to one of said support and mounting plates, and a magnetic surface in the other of said plates opposite said magnet in the attached position.

12. The mounting device as set forth in claim 2 including means for sensing displacement of said mounting plate from the parallel attached position.

13. The mounting device as set forth in claim 12 including control means responsive to a displacement signal from said sensing means for controlling movement of the carriage.

14. The mounting device as set forth in claim 1 wherein said support plate is attached to position the planar support surface in a plane defined by horizontal and vertical carriage movement.

15. A breakaway tool mounting device for supporting a tool holder on a tool carriage which provides three-axis operation in six directions of movement, said mounting device comprising:

a fixed generally planar support surface on said carriage;

a tool mounting plate demountably attached to said support surface, said mounting plate having a generally planar mounting surface disposed parallel to said support surface and defining therewith an attached position;

a magnetic device for releasably holding said mounting plate in said attached position;

a non-redundant location system for providing a fixed relation between said mounting and support surfaces in the attached position, said system including:

a first locator providing operative contact and restraint to movement between said surfaces in five of said six directions of movement;

a second locator providing operative contact and restraint to movement between said surfaces in three of said five directions;

a third locator providing operative contact and restraint to movement between said surfaces in one of said five directions; and, said magnetic device providing restraint to movement in a sixth direction not restrained by said locators.

* * * * *